United States Patent
Ilya et al.

(10) Patent No.: US 7,995,909 B2
(45) Date of Patent: Aug. 9, 2011

(54) AUTO-FOCUSING METHOD

(75) Inventors: Bogdanov Ilya, Gyunggi-do (KR);
Chang Mok Shin, Daegu (KR); Oh Sung Byun, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/654,200

(22) Filed: Dec. 14, 2009

(65) Prior Publication Data

US 2010/0189427 A1    Jul. 29, 2010

(30) Foreign Application Priority Data

Dec. 12, 2008   (KR) .................. 10-2008-0126221
Nov. 24, 2009   (KR) .................. 10-2009-0114095

(51) Int. Cl.
*G03B 3/10*    (2006.01)

(52) U.S. Cl. ........................................... 396/95

(58) Field of Classification Search ............... 396/95
See application file for complete search history.

(56) References Cited

U.S. PATENT DOCUMENTS 7,034,881 B1    4/2006  Hyodo et al.
7,403,634 B2 *  7/2008  Nishiura ................ 382/103
2010/0034427 A1 *  2/2010  Fujimura et al. ........... 382/106
2010/0189427 A1 *  7/2010  Ilya et al. ................. 396/95

FOREIGN PATENT DOCUMENTS

CN         101098403 A      1/2008
JP         2009-141475      6/2009

OTHER PUBLICATIONS

Chinese Office Action issued Jan. 14, 2011 in corresponding Chinese Patent Application 2009102531930.

* cited by examiner

*Primary Examiner* — Rodney E Fuller (57) ABSTRACT

An auto-focusing method includes: setting a central point of area of interest according to a user's input to select a moving object to perform auto tracking of the moving object within an image; setting an auto focusing area encompassing the central point of area of interest, the auto focusing area in which an operation is performed for auto focusing; setting a tracking sub-window encompassing the auto focusing area, the tracking sub-window in which an operation is performed for auto tracking; and tracking, by the central point of area of interest according to the user's input, the auto focusing area and the tracking sub-window, the moving object while changing a position of the auto focusing area and updating a position of the tracking sub-window according to a movement of the moving object.

10 Claims, 13 Drawing Sheets

AUTO-FOCUSING METHOD

CROSS-REFERENCE TO RELATED APPLICATIONS

This application claims the priority of Korean Patent Application No. 10-2008-0126221 filed on Dec. 12, 2008, and Korean Patent Application No. 10-2009-0114095 filed on Nov. 24, 2009, in the Korean Intellectual Property Office, the disclosure of which is incorporated herein by reference.

BACKGROUND OF THE INVENTION

1. Field of the Invention

The present invention relates to an auto-focusing method in a camera device, and more particularly, to an auto-focusing method that performs auto tracking of a moving object within a predetermined image in a camera module mounted onto a mobile communications device, such as a cellular phone, and provides continuous tracking of the moving object even when the moving object disappears from the image and subsequently reappears.

2. Description of the Related Art

In general, compact camera modules (CCMs) are small-sized and have been used in various kinds of IT applications such as toy cameras and portable mobile communications devices including camera phones, PDAs and smartphones. An increasing number of devices, mounted with small camera modules, have been released to satisfy consumer demand.

These camera modules that use image sensors, such as CCD or CMOS sensors, as main components are being manufactured. An image of an object is collected through an image sensor, and the collected image is stored as data in memory of the camera module. The stored data is displayed as an image through an LCD of the camera module or a display device such as a PC monitor.

Recently, auto-focusing technology has been widely used. According to auto-focusing technology, a subject is detected using a luminance signal of the subject that is captured through a camera lens, and an optical system is driven according to the detected subject to obtain focus on the subject.

According to autofocus via contrast detection, not every single subject within a photographing range of a camera necessarily becomes a target for auto-focusing, and a subject of interest within the photographing range generally becomes a target for auto-focusing. Auto-focusing based on contrast detection limits a target for auto-focusing to a subject within a partial range by extracting an image signal within an auto-focusing range among incoming image signals within the entire photographing range of an image sensor, and controlling focus so that the extracted image signal has the highest contrast.

However, as for auto-focusing using the current technology, when a subject moves within a predetermined image and is finally separated from an area of the image (for example, when the subject moves out of the image and disappears from the image), in the related art, existing information about the subject being tracked is lost, and thus it is no longer possible to track the subject.

In addition, in auto-focusing based on contrast detection according to the related art, an image may be unfocused while a lens position changes in order to find an optimal lens position at which a focused image is generated. In this case, it is more likely to fail to track a moving object of interest.

Meanwhile, when actual photographing is carried out, one subject is not always a target for auto-focusing, and a target for auto-focusing may need to be instantly shifted from one subject to another subject according to a user's judgement. Here, when it comes to setting a region of interest according to a user's input using a trackball or the like, the above target shift may cause problems with making a quick tracking response to the moving object.

In addition, DSC cameras currently being used provide moving object tracking ability. However, separate algorithms are required for the application to small devices including mobile phones due to hardware limitations such as memory.

SUMMARY OF THE INVENTION

An aspect of the present invention provides an auto focusing method that ensures stable tracking of a subject without losing information about the subject being tracked, even when the subject moves within a predetermined image and is finally separated from the image.

An aspect of the present invention also provides an auto focusing method that allows for continuous tracking of a subject when the subject is separated from a predetermined image, when the subject is hidden by another object, or when the subject comes back into a predetermined area after disappearing.

An aspect of the present invention also provides an auto focusing method that ensures robust tracking of a moving object despite a change in the position of a lens to generate a focused image, a change in zoom factor such as zooming in and zooming out, a change in the location of a camera view, a change of image contrast caused by a change in lighting conditions, a change in the size of a subject being tracked and the rotation of the subject.

An aspect of the present invention also provides an auto focusing method that quickly responds to a target shift from one moving object to another and can be optimally applied to small devices such as mobile phones in terms of hardware.

According to another aspect of the present invention, there is provided an auto-focusing method including: setting a central point of area of interest according to a user's input to select a moving object to perform auto tracking of the moving object within an image; setting an auto focusing area encompassing the central point of area of interest, the auto focusing area in which an operation is performed for auto focusing; setting a tracking sub-window encompassing the auto focusing area, the tracking sub-window in which an operation is performed for auto tracking; and tracking, by the central point of area of interest according to the user's input, the auto focusing area and the tracking sub-window, the moving object while changing a position of the auto focusing area and updating a position of the tracking sub-window according to a movement of the moving object, wherein an edge part of the tracking sub-window is maintained in alignment with an edge part of the image, and the auto focusing area alone inside the tracking sub-window moves toward the edge part of the image in order to track the moving object within the tacking sub-window when the moving object for auto tracking is being separated from the edge part of the image, and the auto focusing area and the tracking sub-window stay within the edge part of the image even when the moving object for auto tracking moves outside the edge part of the image and the auto focusing area alone moves within the tracking sub-window and reaches the edge part of the image.

The tracking of the moving object may include: cutting the image inside the tracking sub-window to generate sub-images; smoothing the sub-images in preceding and succeeding frames by convolving the sub-images according to a Gaussian function; calculating gradients of the sub-images by convolving the sub-images with a derivative of the Gaussian function; and performing iteration to locate a new central point of area of interest.

The calculation in conjunction with the tracking of the moving object may be stopped when the central point of area of interest moves by one pixel, when the number of iteration exceeds a predetermined limit value or when the central point of area of interest is located outside boundaries.

One central point of area of interest may be input by the user by touchpad.

According to another aspect of the present invention, there is provided an auto-focusing method including: setting a central point of area of interest according to a user's input to select a moving object to perform auto tracking of the moving object within an image; setting an auto focusing area encompassing the central point of area of interest, the auto focusing area in which an operation is performed for auto focusing; setting a tracking sub-window encompassing the auto focusing area, the tracking sub-window in which an operation is performed for auto tracking; tracking, by the central point of area of interest according to the user's input, the auto focusing area and the tracking sub-window, the moving object while changing a position of the auto focusing area and updating a position of the tracking sub-window according to a movement of the moving object, outputting a first color pattern corresponding to an average color value with respect to a predetermined area around the central point of area of interest set by the user in a frame right before the moving object disappears, and setting a central point of area of interest on the basis of the first color pattern when the moving object disappears from the image; resetting a tracking sub-window centering on the central point of area of interest on the basis of the first color pattern, and outputting second color patterns corresponding to average color values with respect to a plurality of areas each having a size corresponding to a predetermined area around the central point of area of interest on the basis of the first color pattern in the reset tracking sub-window in a frame after the moving object disappears; and comparing the first color pattern with each of the second color patterns to determine that the moving object comes back into the image when a comparison difference is smaller than a predetermined threshold value, and setting a central point of area of interest based on a color pattern of an area where the corresponding second color pattern is output, as a central point of area of interest to track the moving object having reappeared.

An edge part of the tracking sub-window may be maintained in alignment with an edge part of the image, and the auto focusing area alone inside the tracking sub-window moves toward the edge part of the image in order to track the moving object within the tacking sub-window when the moving object for auto tracking is being separated from the edge part of the image, and the auto focusing area and the tracking sub-window may stay within the edge part of the image even when the moving object for auto tracking moves outside the edge part of the image and the auto focusing area alone moves within the tracking sub-window and reaches the edge part of the image.

The predetermined area around the central point of area of interest set by the user may be the auto focusing area centering on the central point of area of interest set by the user.

The tracking of the moving object may include: cutting the image inside the tracking sub-window to generate sub-images; smoothing sub-images in preceding and succeeding frames by convolving the sub-images according to a Gaussian function; calculating gradients of the sub-images by convolving the sub-images with a derivative of the Gaussian function; and performing iteration to locate a new central point of area of interest.

The calculation in conjunction with the tracking of the moving object may be stopped when the central point of area of interest moves by one pixel, when the number of iteration exceeds a predetermined limit value or when the central point of area of interest is located outside boundaries.

The one central point of area of interest may be input by the user by touchpad.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 1:
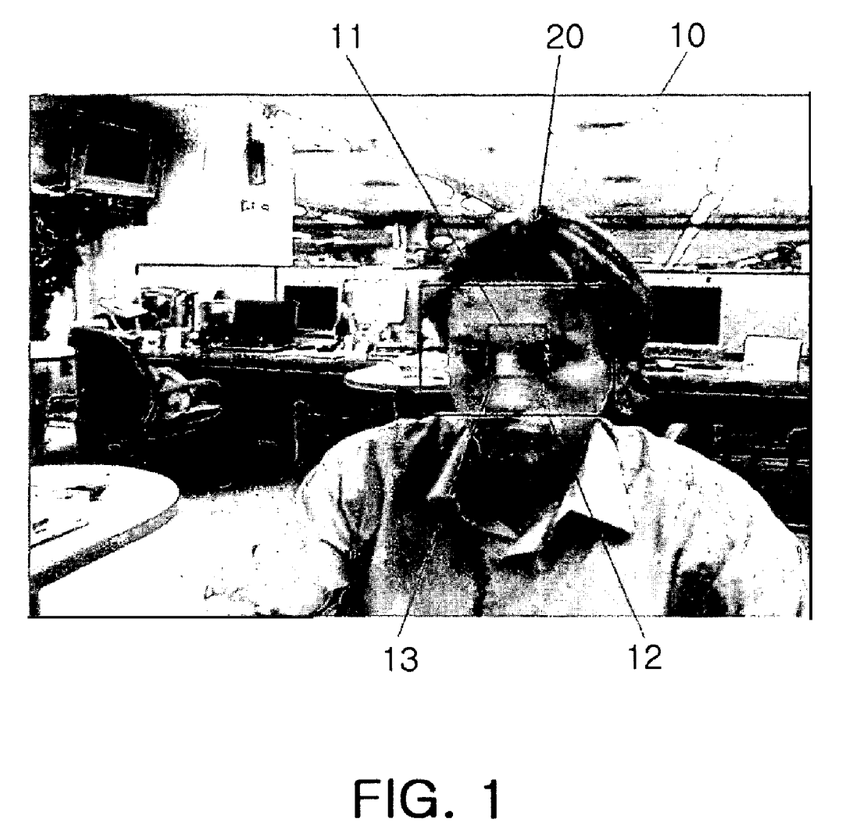
FIG. 1 is a view illustrating one central point of area of interest, an auto focusing area and a tracking sub-window that are used to perform an auto-focusing method according to an exemplary embodiment of the present invention.

As shown in FIG. 1, auto-focusing according to an exemplary embodiment of the invention is carried out according to three areas.

These three areas consist of one central point of area of interest 11, an auto focusing area 13 and a tracking sub-window 12. The one central point of area of interest 11 is selected according to a user's input in order to execute auto tracking with respect to a moving object 20 within a predetermined image 10. The auto focusing area 13 is set to encompass the central point of area of interest 11. The tracking sub-window 12 is set to encompass the auto focusing area 13.

The one central point of area of interest 11 is selected by the user in order to track the moving object 20.

Contrary to the related art, the above-described one central point of area of interest 11 may be selected according to the user's input by touchpad. With the use of the touchpad, it is possible to make quick response to modification and selection of a target, that is, a moving object. Furthermore, the touchpad is suited as a target selection unit for small devices such as mobile devices.

The auto focusing area 13 is an area where a focusing process is performed on the basis of the selected area of central point of area of interest.

In this embodiment of the invention, in addition to the auto focusing area 13, the tracking sub-window 12 encompassing the auto focusing area 13 is further included. Image processing is only performed within the tracking sub-window 12, which can reduce memory usage and computation time. In particular, the inclusion of the tracking sub-window is adopted so as to be more suited to small devices such as mobile phones, and is also necessary to maintain data to be described below. In general, since 30 frames per second are processed, a region of interest is not shifted a large distance between the frames. When the maximum shift between two frames is 20% of an image, it is possible to reduce computational complexity by as much as 20 times and reduce the memory usage for the computation by as much as 5 times.

Figures 2A, 2B:
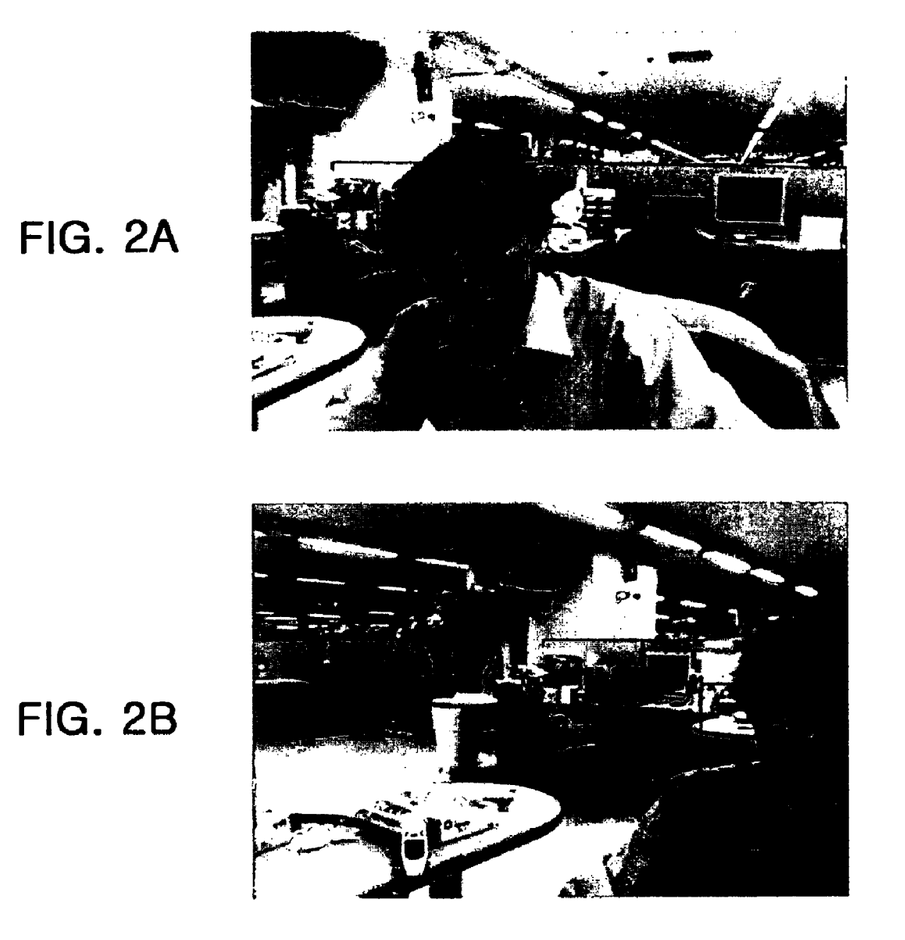
FIGS. 2A through 2C are views exemplifying the operation of one central point of area of interest, an auto focusing area and a tracking sub-window that are used to perform an auto-focusing method according to an exemplary embodiment of the present invention.

As shown in FIG. 2A, the above-described area of central point of area of interest 11, auto focusing area 13 and tracking sub-window 12 track the moving object 20 within the predetermined image 10. The position of the auto focusing area 13 is changed and the position of the tracking sub-window 12 is updated according to the movement of the moving object 20.

When it comes to the movement of the moving object 20, as shown in FIG. 2B, when the moving object 20 for auto tracking is moving from the right edge to the outside of the predetermined image 10, the edge part of the tracking sub-window 12 is maintained in alignment with the edge part of the image 10, while the auto focusing area 13 moves to the right toward the edge part of the image 10 so that the auto focusing area 13 alone inside the tracking sub-window 12 keeps tracking the moving object 20 within the tracking sub-window 12.

Figure 2C:
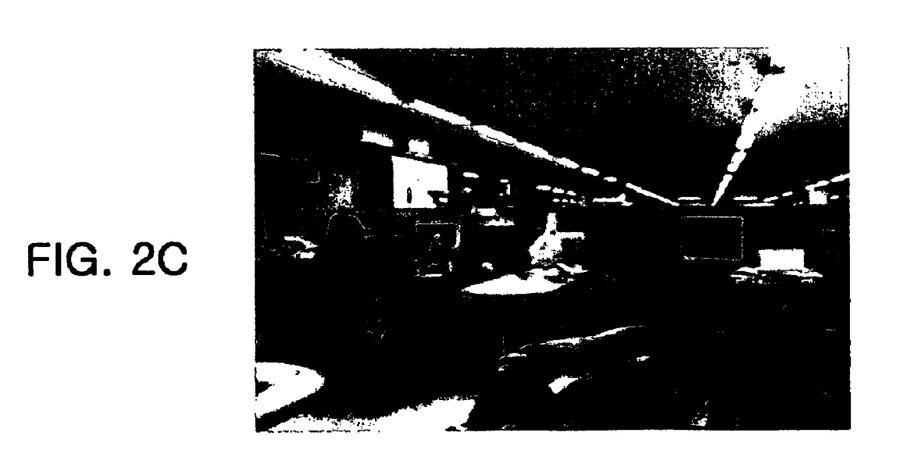

As shown in FIG. 2C, even when the moving object 20 for auto tracking moves outside the right of the image 10 (for example, when the moving object disappears from the screen), and the auto focusing area 13 moves within the tracking sub-window 12 and finally reaches the edge part of the entire image 10, both the auto focusing area 13 and the tracking sub-window 12 are configured to stay at the edge part of the image 10.

That is, in the related art, when a subject moves within a predetermined image and becomes separated from the predetermined image (for example, when the subject moves outside the image and disappears), existing information about the subject being tracked is lost. On the other hand, in this embodiment, since both the auto focusing area 13 and the tracking sub-window 12 are configured to stay at the edge part of the corresponding images, tracking data about the moving object is maintained to thereby ensure the stable tracking of the subject.

A processing operation in association with the tracking of a moving object that ensures robust tracking of a moving object according to an exemplary embodiment of the invention will now be described. First, the image within the tracking sub-window 12 is cut to generate sub-images.

Then, the generated sub-images in the previous and following frames n and n+1 are convolved according to a Gaussian Function, that is, Equation 1, to perform a smoothing operation thereof.

$$G(x) = \frac{1}{\sqrt{2\pi}\,\sigma} e^{-\frac{x^2}{2\sigma^2}}$$ [Equation 1]

In order to smooth early images, 0=0.1 is satisfied. For the downscaling of the sub-images, 0=0.9 is satisfied.

For example, a sample Gaussian matrix for 0=0.8 is as follows:

$$g(x) = \frac{d^n}{dx^n} e^{-\frac{x^2}{2\sigma^2}}$$
$$= P_{n,\sigma}(x) e^{-\frac{x^2}{2\sigma^2}}$$ [Equation 2]

The preceding and succeeding sub-images are convolved with the derivatives of the Gaussian function to obtain gradients of the previous and following sub-images.

Here, the derivative of the Gaussian function corresponds to real valued functions.

In a first dimension, the derivative of the Gaussian function is multiplication of a polynomial and the Gaussian function according to Equation 2.

| 0.000000 | 0.000022 | 0.000191 | 0.000387 | 0.000191 | 0.000022 | 0.000000 |
|---|---|---|---|---|---|---|
| 0.000022 | 0.000786 | 0.006559 | 0.013303 | 0.006559 | 0.000786 | 0.000022 |
| 0.000191 | 0.006559 | 0.054721 | 0.110981 | 0.054721 | 0.006559 | 0.000191 |
| 0.000387 | 0.013303 | 0.110981 | 0.225083 | 0.110981 | 0.013303 | 0.000387 |
| 0.000191 | 0.006559 | 0.054721 | 0.110981 | 0.054721 | 0.006559 | 0.000191 |
| 0.000022 | 0.000786 | 0.006559 | 0.013303 | 0.006559 | 0.000786 | 0.000022 |
| 0.000000 | 0.000022 | 0.000191 | 0.000387 | 0.000191 | 0.000022 | 0.000000 |

Figure 3:
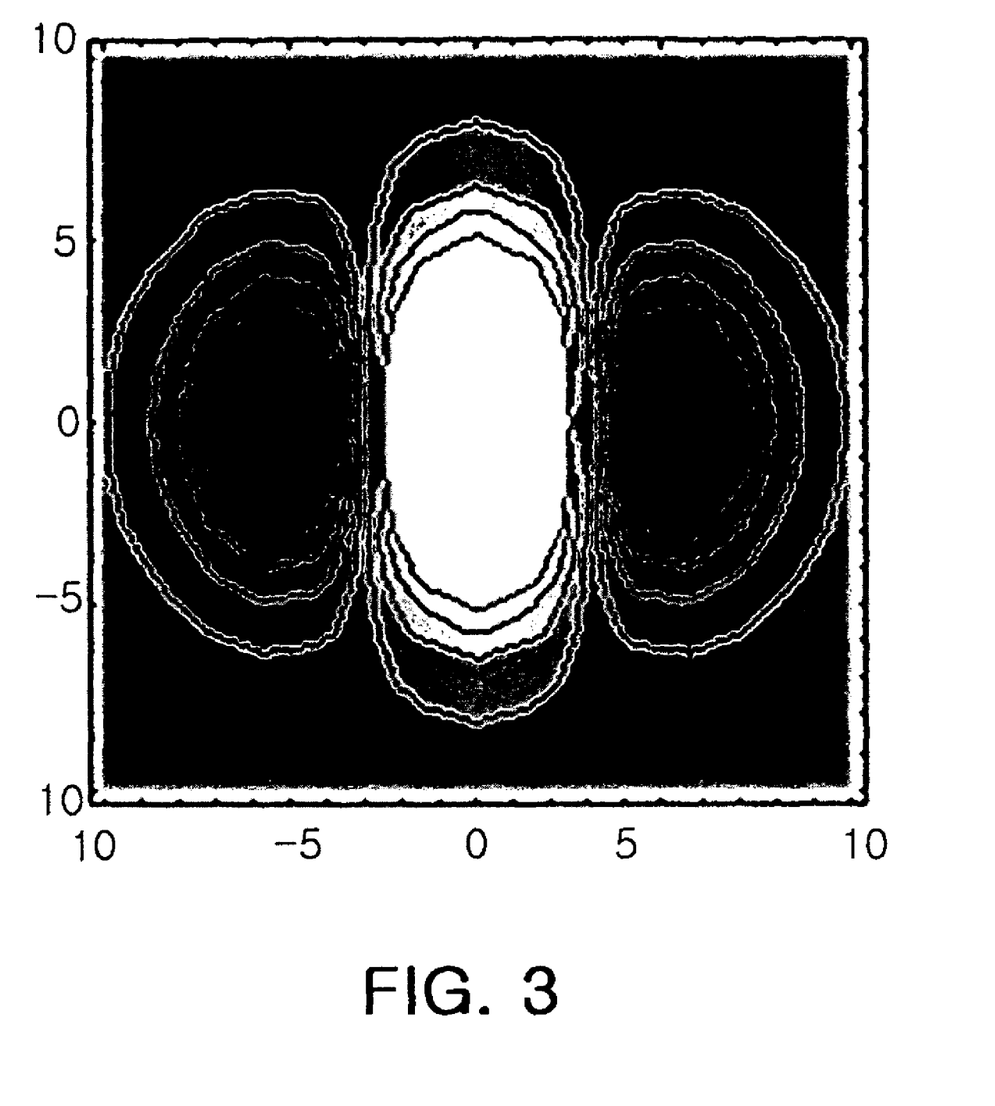
FIG. 3 is a graph illustrating a derivatives of a Gaussian function that consists of a derivative of a Gaussian function along the x-axis and a derivative of a Gaussian function along the y-axis.

FIG. 3 is a graph illustrating a derivative of a Gaussian function that consists of a derivative of a Gaussian function along the x-axis and a derivative of a Gaussian function along the y-axis.

Lastly, iteration is performed in order to locate a new central point of area of interest.

The order of the iteration has the following features:

1. The iteration runs five times on average (recommended).
2. During a first iteration (k=1), initial guess is set by predicting a movement by tracking preceding frames.
3. An image structure is obtained using Gaussian functions and Gaussian derivative filters in order to obtain a method of calculating image displacement that does not change by rotation, noise, zoom factor and defocusing.
4. An each iteration have a minimum display image for each level (by using 2 levels with downscale 4 factors). In order to detect a big image shift and correct shift, it is downscale for an initial size.

Calculation in association with the tracking of the moving object may be stopped when the central point of area of interest is moved by one pixel, when the number of iteration exceeds a predetermined limit value or when the central point of area of interest exists outside the boundaries.

By setting the tracking sub-window and tracking the moving object, this invention produces the following effects, which will be described with reference to FIGS. 9A through 4D, FIGS. 5A through 5C, and FIGS. 6A and 6B.

First, FIGS. 4A through 4D illustrate tracking 10 performance when image focusing continuously changes according to an exemplary embodiment of the invention.

Figure 4A:
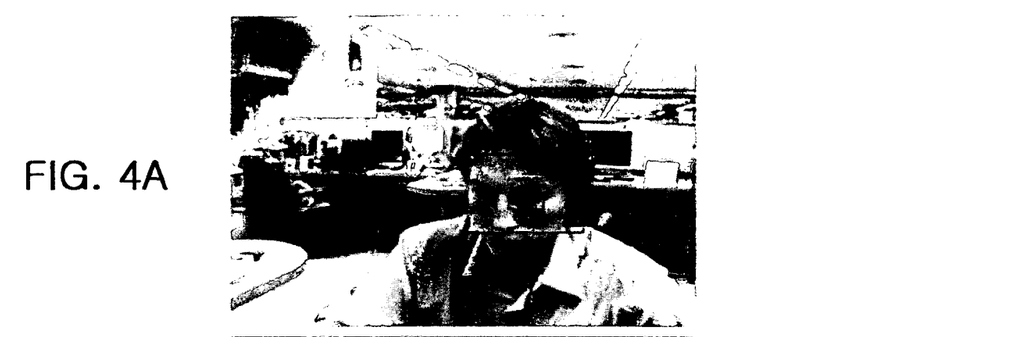
FIGS. 4A through 4D are views illustrating tracking performance when image focusing continuously changes according to an exemplary embodiment of the present invention.
Figure 4B:
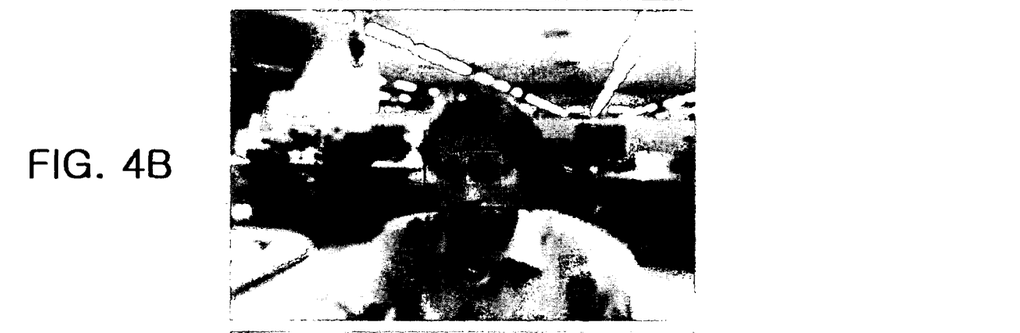
Figure 4C:
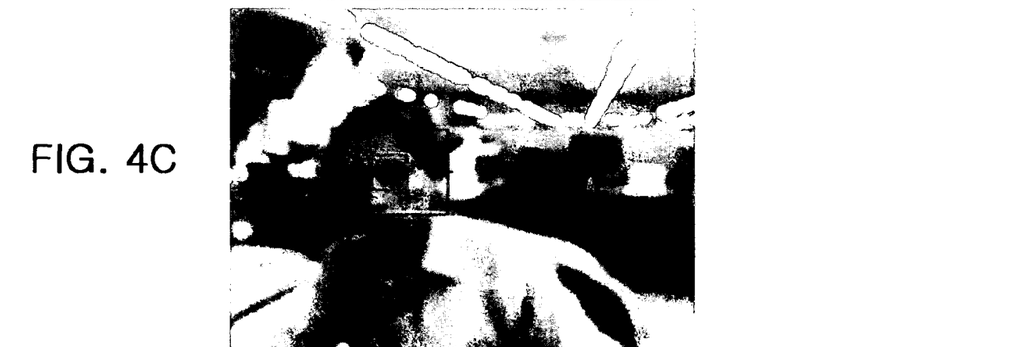
Figure 4D:
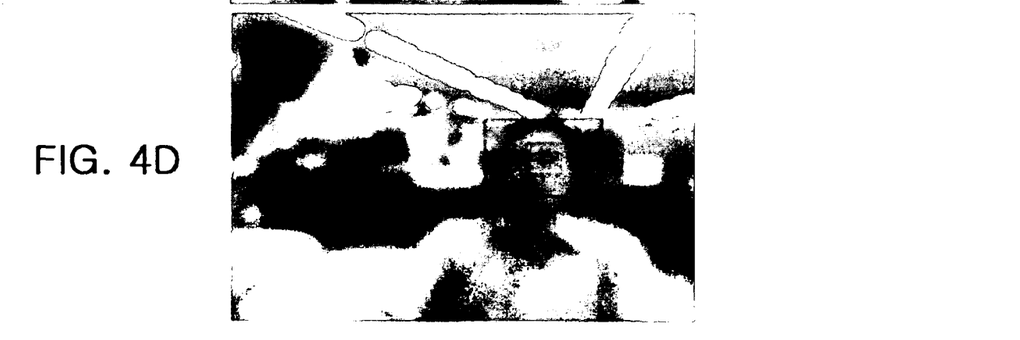

That is, even when an image is defocused due to a change in the position of a lens to create a focused image, as shown in FIGS. 4B through 4D, the one central point of area of interest 11, selected by a user's input, with respect to the moving object 20, the auto focusing area 13, and the tracking sub-window 12 are shown to stably track the moving object, which is a target of interest.

Figure 5A:
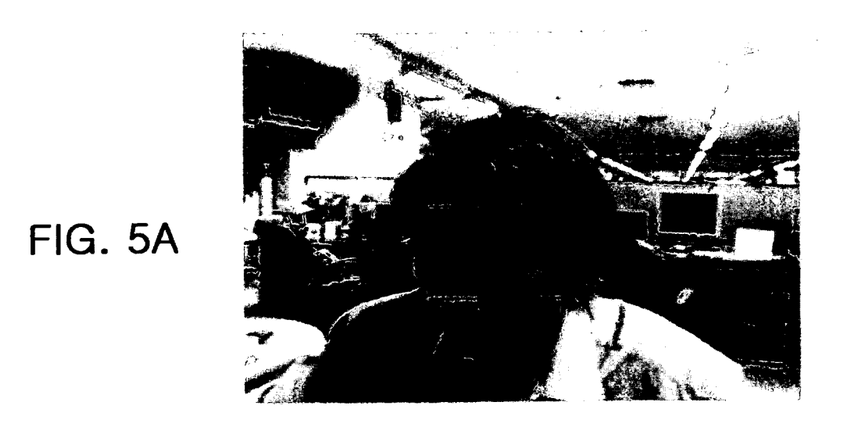
FIGS. 5A through 5C are views illustrating tracking performance when zoom factor and a location of a camera view are changed according to an exemplary embodiment of the present invention.
Figure 5B:
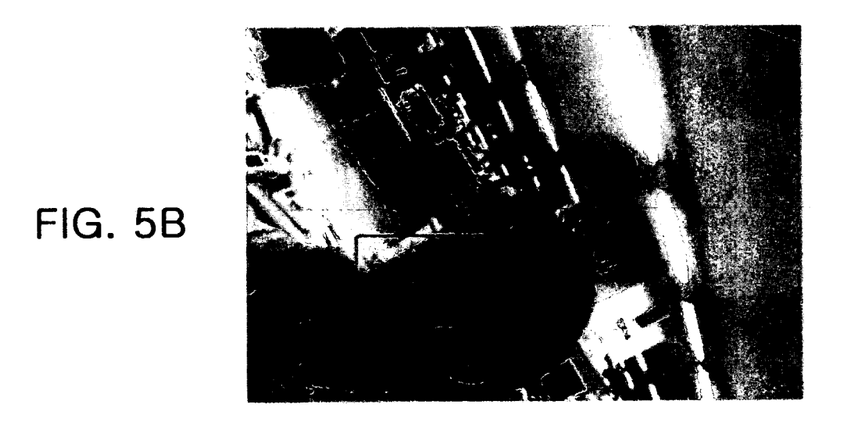
Figure 5C:
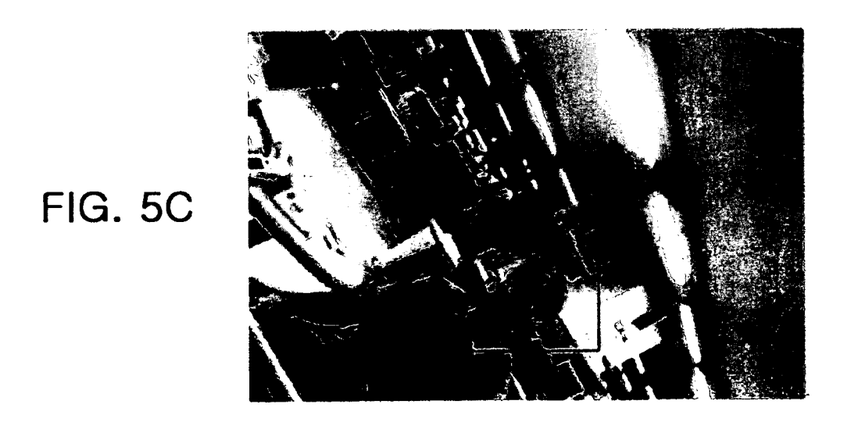

Furthermore, FIGS. 5A through 5C illustrate tracking performance when zoom factor and a location of a camera view change according to an exemplary embodiment of the invention.

That is, while arranging for photographing, the user may change an image zoom factor, such as zooming in or zooming out, or the location of the camera view. According to this embodiment, as shown in FIGS. 5A through 5C, the one central point of area of interest 11, selected by the user's input with respect to the moving object 20, the auto focusing area 13, and the tracking sub-window 12 are shown to stably track the moving object, which is a target of interest.

Figure 6A:
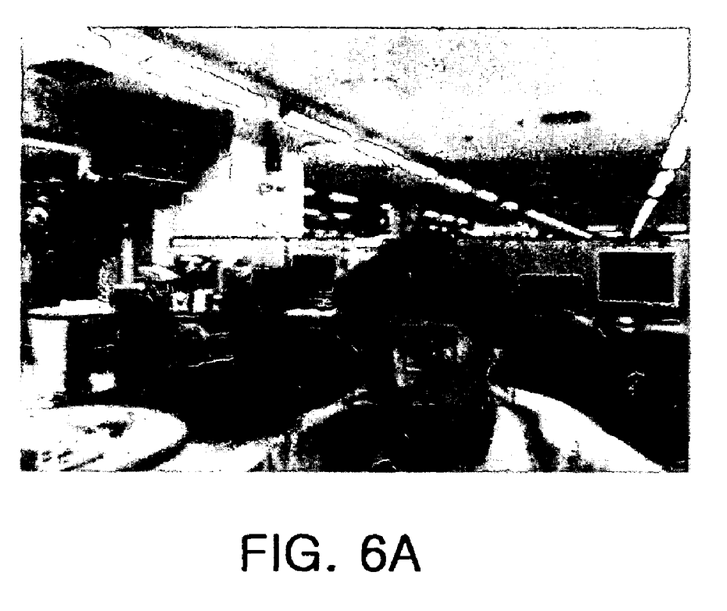
FIGS. 6A and 6B are views illustrating tracking performance when image contrast is changed according to a change in lighting conditions according to an exemplary embodiment of the present invention.
Figure 6B:
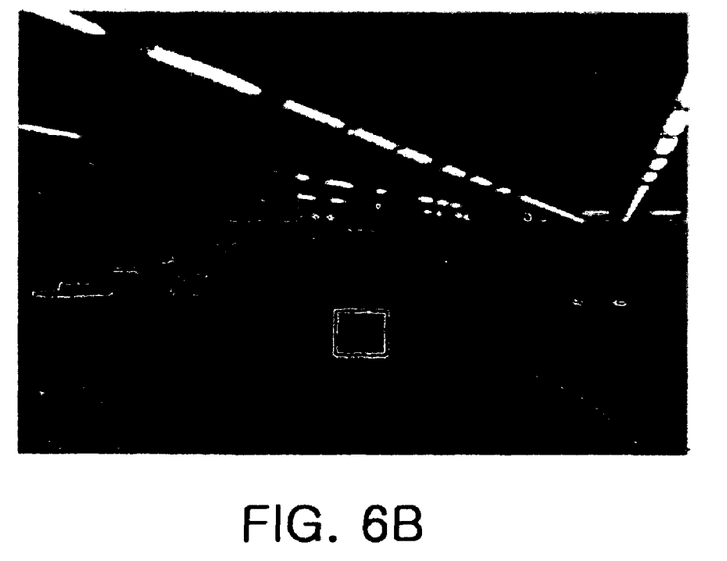

FIGS. 6A and 6B illustrate tracking performance when image contrast is changed according to a change in lighting conditions according to an exemplary embodiment of the invention.

That is, while adjusting the camera to adapt to the current lighting conditions, the image contrast may change. Even in this situation, as shown in FIGS. 6A and 6B, the one central point of area of interest 11, selected by a user's input with respect to the moving object 20, the auto focusing area 13, and the tracking sub-window 12 are shown to stably track the moving object, which is a target of interest.

Figure 7:
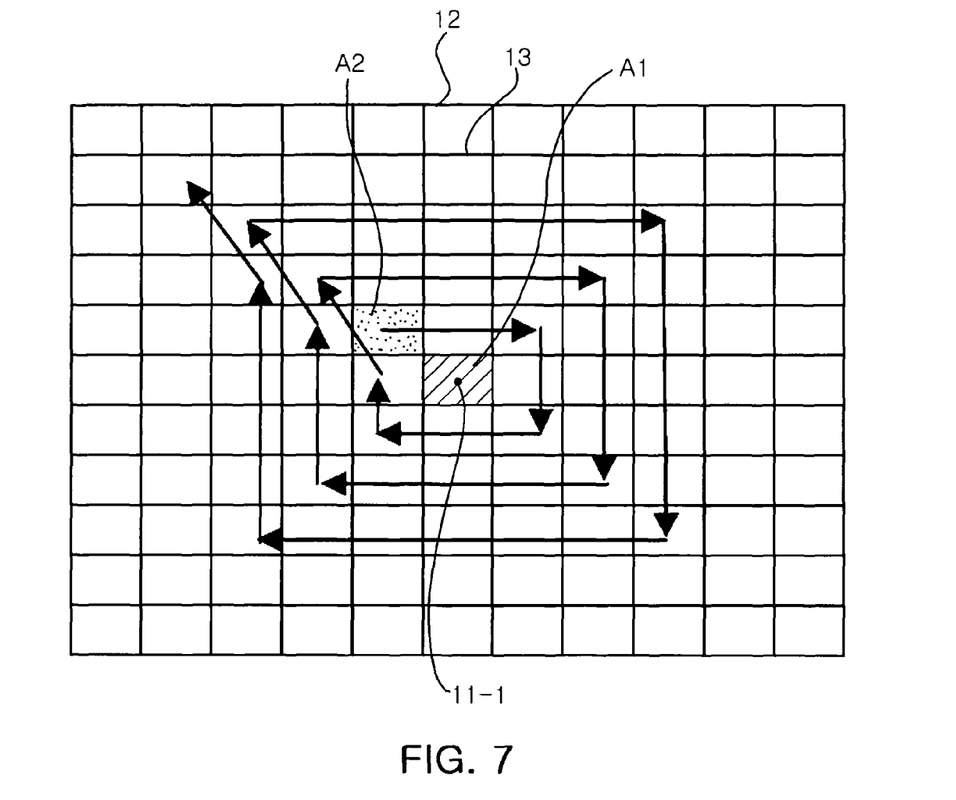
FIG. 7 is a view illustrating a tracking method when a subject disappears from an image according to an exemplary embodiment of the present invention.
Figure 8A:
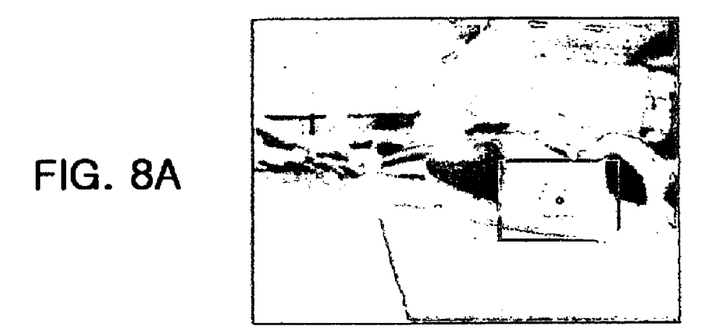
FIGS. 8A through 8D are views illustrating tracking performance when a subject being tracked rotates and changes in size according to an exemplary embodiment of the present invention.
Figure 8B:
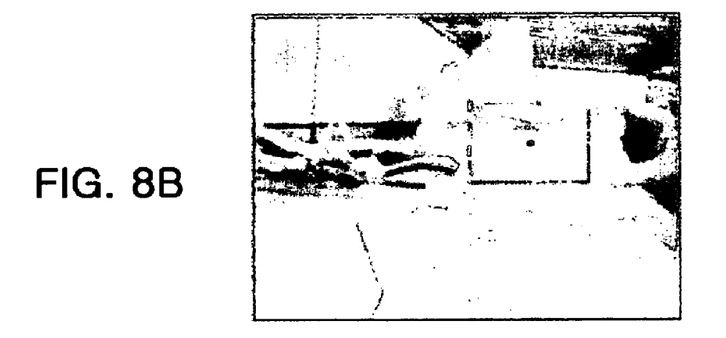
Figure 8C:
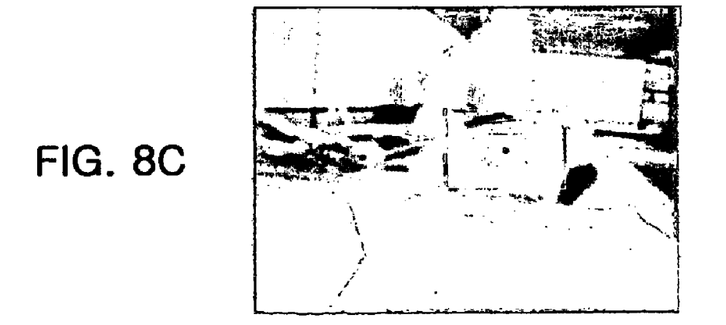
Figure 8D:
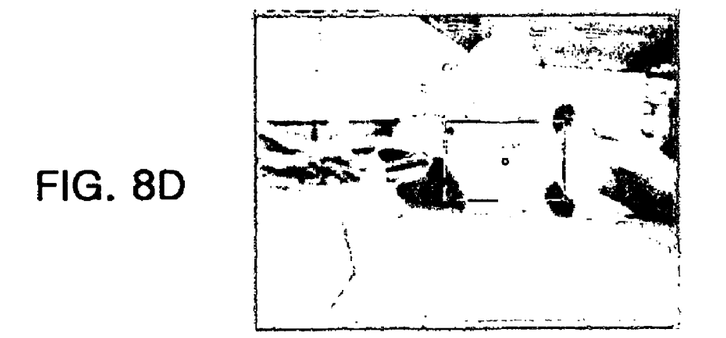
Figure 9A:
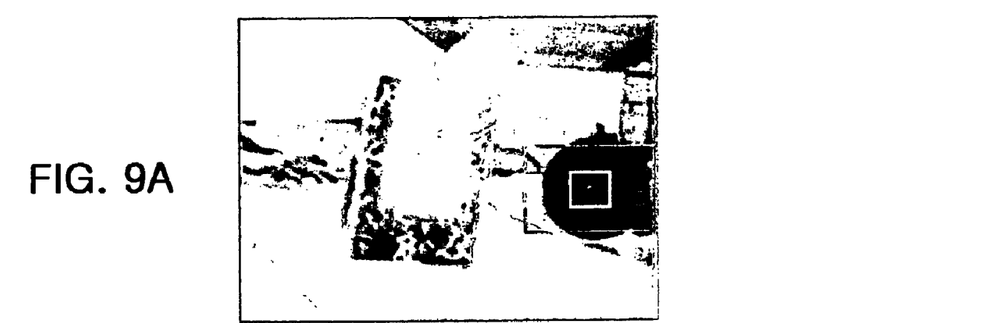
FIGS. 9A through 9D are views illustrating tracking performance when a subject being tracked is hidden by another object according to an exemplary embodiment of the present invention.
Figure 9B:
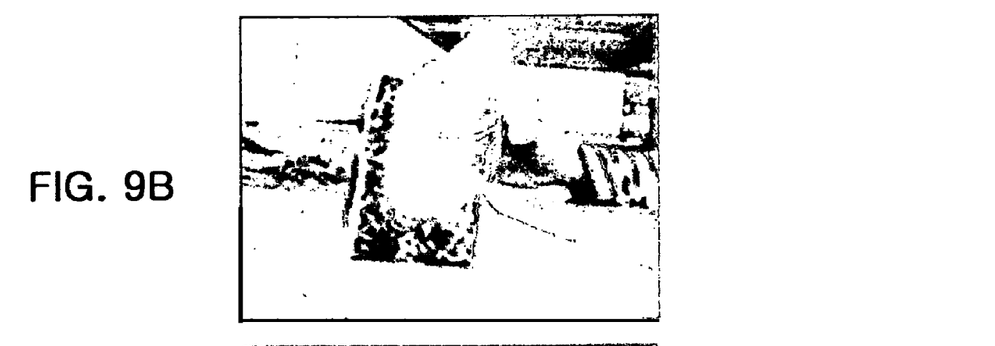
Figure 9C:
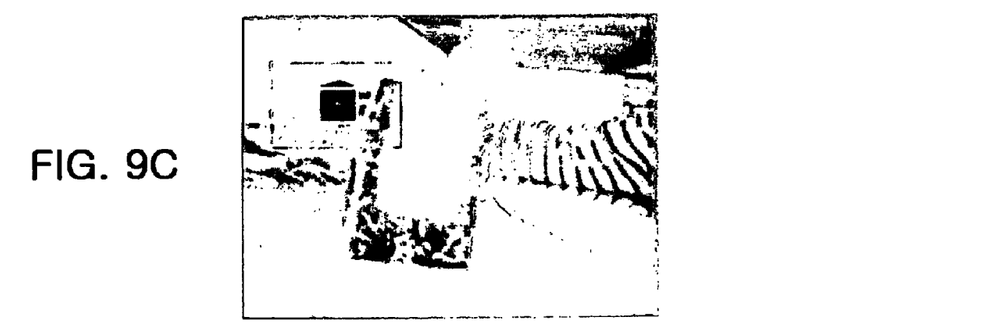
Figure 9D:
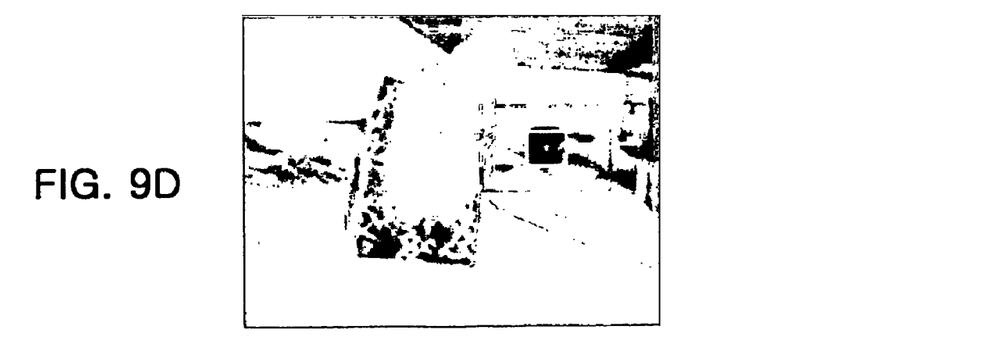

In this embodiment, an algorithm allowing for continuous tracking is provided even when it is impossible to track a subject (moving object) being tracked, for example, when the moving object is hidden by another object or disappears from an image, and then the moving object appears within the image again. FIG. 7 is a view illustrating a tracking method when a subject disappears from an image.

As shown in FIG. 7, according to a method of tracking the moving object having disappeared, at a position at which the moving object is finally detected in an image frame, a central point of area of interest 11-1 is determined, and a first color pattern corresponding to an average color value of a predetermined area A1 centering on the central point of area of interest 11-1 is obtained. Then, a tracking sub-window 12 centering on the central point of area of interest 11-1 is set. In an image frame being input thereafter, the tracking sub-window 12 is divided into areas each having the same size as the finally detected area A1 of the moving object, and second color patterns corresponding to average color values of the divided areas are obtained. As shown in FIG. 7, the process of obtaining the second color patterns with respect to the divided areas may be performed from an upper-left adjacent area B1 to the finally detected area A1 in a counterclockwise spiral. The area where the first color pattern is obtained on the basis of area of central point of area of interest 11-1 or the area where the second color pattern to be compared with the first color pattern may be determined to have the same size as the auto focusing area 12, shown in FIG. 1.

The second color pattern, output with respect to each divided region, is compared with the first color pattern. When a comparison result between the first color pattern and each of the second color patterns is smaller than a predetermined threshold value, it is determined that the moving object having disappeared reappears in the image. A central point of area of interest of a corresponding area is obtained again to thereby continue tracking the moving object as described above.

FIGS. 8A through 8D illustrate tracking performance when a subject being tracked rotates or changes in size according to an exemplary embodiment of the invention. As shown in FIGS. BA through 8D, the subject may change due to the size and rotation of the subject while the subject is being tracked. In this embodiment of the invention, even in these situations, robust tacking of the moving object can be ensured.

FIGS. 9A through 9D illustrate tracking performance when a subject being tracked is hidden by another object according to an exemplary embodiment of the invention. As shown in FIGS. 9A through 9D, while the subject is being tracked, the subject may be hidden by another object for a predetermined period of time. In this embodiment, even in this situation, robust tracking of the moving object is ensured.

Figure 10A:
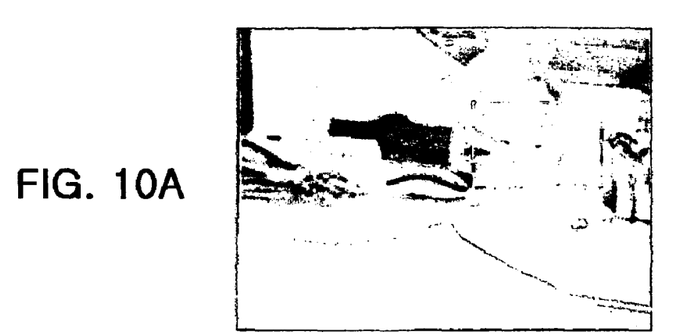
FIGS. 10A through 10D are views illustrating tracking performance when a subject being track moves outside a tracking area according to an exemplary embodiment of the present invention.
Figure 10B:
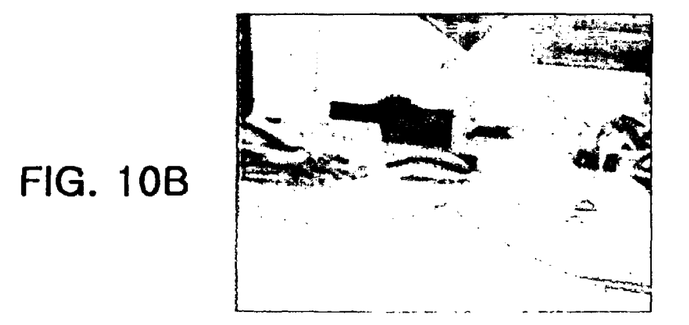
Figure 10C:
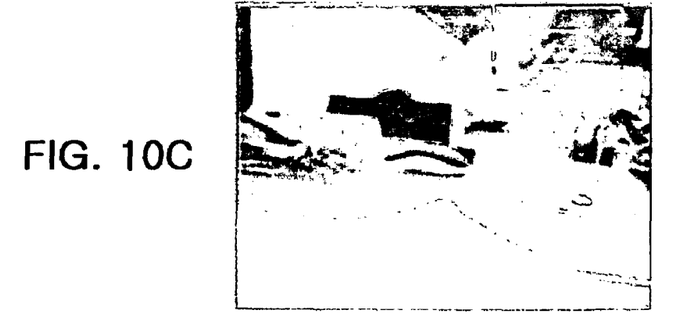
Figure 10D:
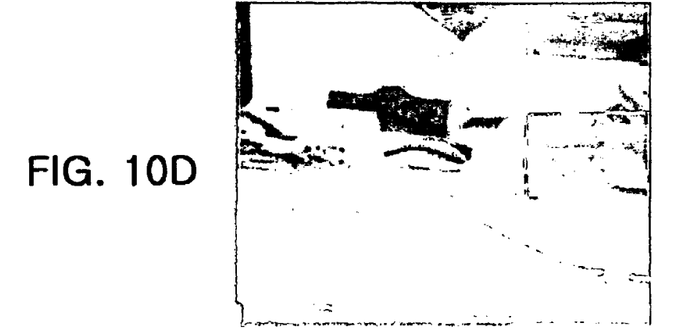

FIGS. 10A through 10D illustrate tracking performance when a subject being tracked moves out of the tracking area according to an exemplary embodiment of the invention. As shown in FIGS. 10A through 1 OD, the subject may move out of the tracking area while the subject is being tracked. In this embodiment, even in this situation, robust tracking of the moving object is ensured.

Figure 11:
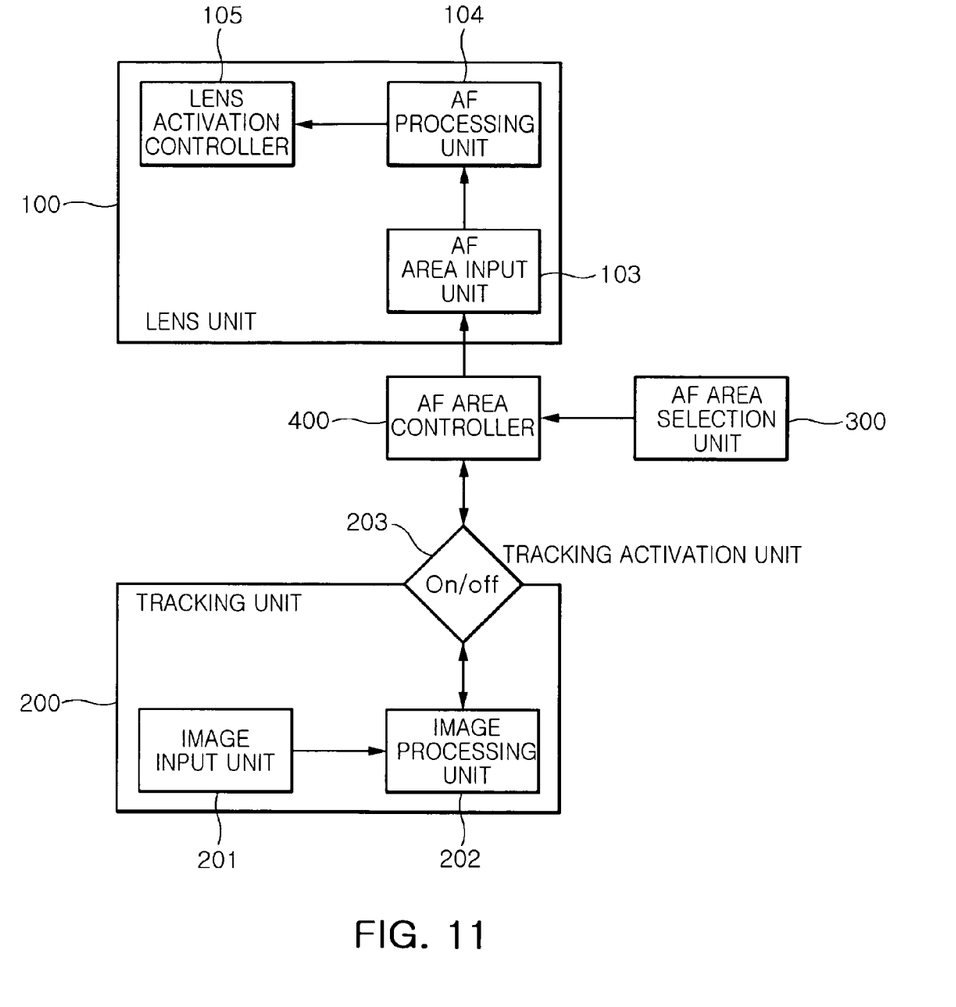
FIG. 11 is a block diagram illustrating an auto focusing system according to an exemplary embodiment of the present invention.

As shown in FIG. 11, an auto focusing system having the above-described algorithm according to the exemplary embodiment of the invention installed therein includes a lens unit 100, a tracking unit 200, an auto focusing area selection unit 300 and an auto focusing controller 400.

First, the auto focusing area selection unit 300 receives an input with respect to a region of interest from a user. In this embodiment, the user inputs the region of interest by "touchpad."

The region of interest, input to the auto focusing area selection unit 300, is input to the auto focusing controller 400. As described above in regard to the algorithm, the auto focusing controller 400 sets the central point of area of interest 11 selected according to the user's input in order to perform auto tracking with respect to the moving object 20 within the image 10, the auto focusing area 13 encompassing the central point of area of interest 11, and the tracking sub-window 12 encompassing the auto focusing area 13.

The tracking unit 200 tracks the subject and automatically moves a location of an auto focusing area while tracking the movement of the subject within the region of interest selected by the user on screen. In the tracking unit 200, an image is input from an image input unit 201, an image processing unit 202 sets and updates an auto focusing area in the image, input from the image unit 201, and sets a new area and compares color patterns when the moving object disappears from the image. The operation of the auto tracking function is determined by a tracking activation unit 203.

The lens unit 100 enables photographing a focused image of the region of interest being tracked by the tracking unit 200. The auto focusing area being tracked is input to an auto focusing input unit 103, and auto focusing data is calculated in an auto focusing processing unit 104. A lens activation controller 105 sets and determines the position of a lens unit (not shown) for auto focusing on the basis of the auto focusing data.

Figure 12:
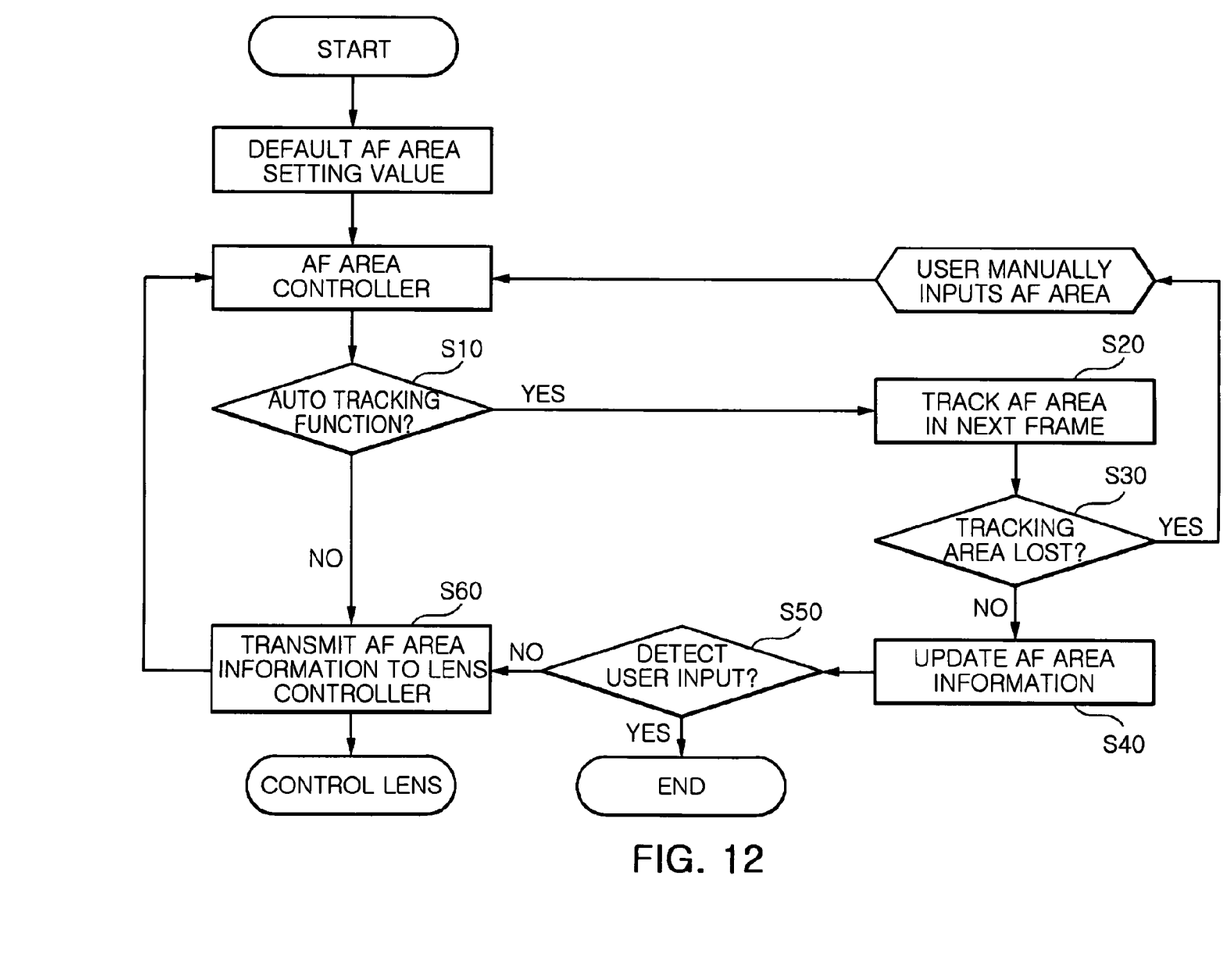
FIG. 12 is a flowchart illustrating an auto-focusing method that is performed using the system of FIG. 11.

FIG. 12 is a flowchart illustrating the above-described operation of the auto focusing system with respect to the region of interest.

As shown in FIG. 12, a default auto focusing area setting value is input to the auto focusing area controller 400, and it is determined whether an auto tracking function is activated or not in operation S10.

When auto tracking is activated, after an auto focusing area in a next frame is tracked in operation S20, information about the auto focusing area is updated in operation S40.

When a user's input is not detected in operation S50, a lens is controlled after the information about the auto focusing area is transmitted to the lens activation controller 105 in operation S60.

Meanwhile, according to determination about a tracking area in operation S30, when there is no area to track, the user is allowed to select an auto focusing area, and the area selected by the user is input to the auto focusing controller 400. The above-described operations S10 through S60 are repeated.

Figure 13:
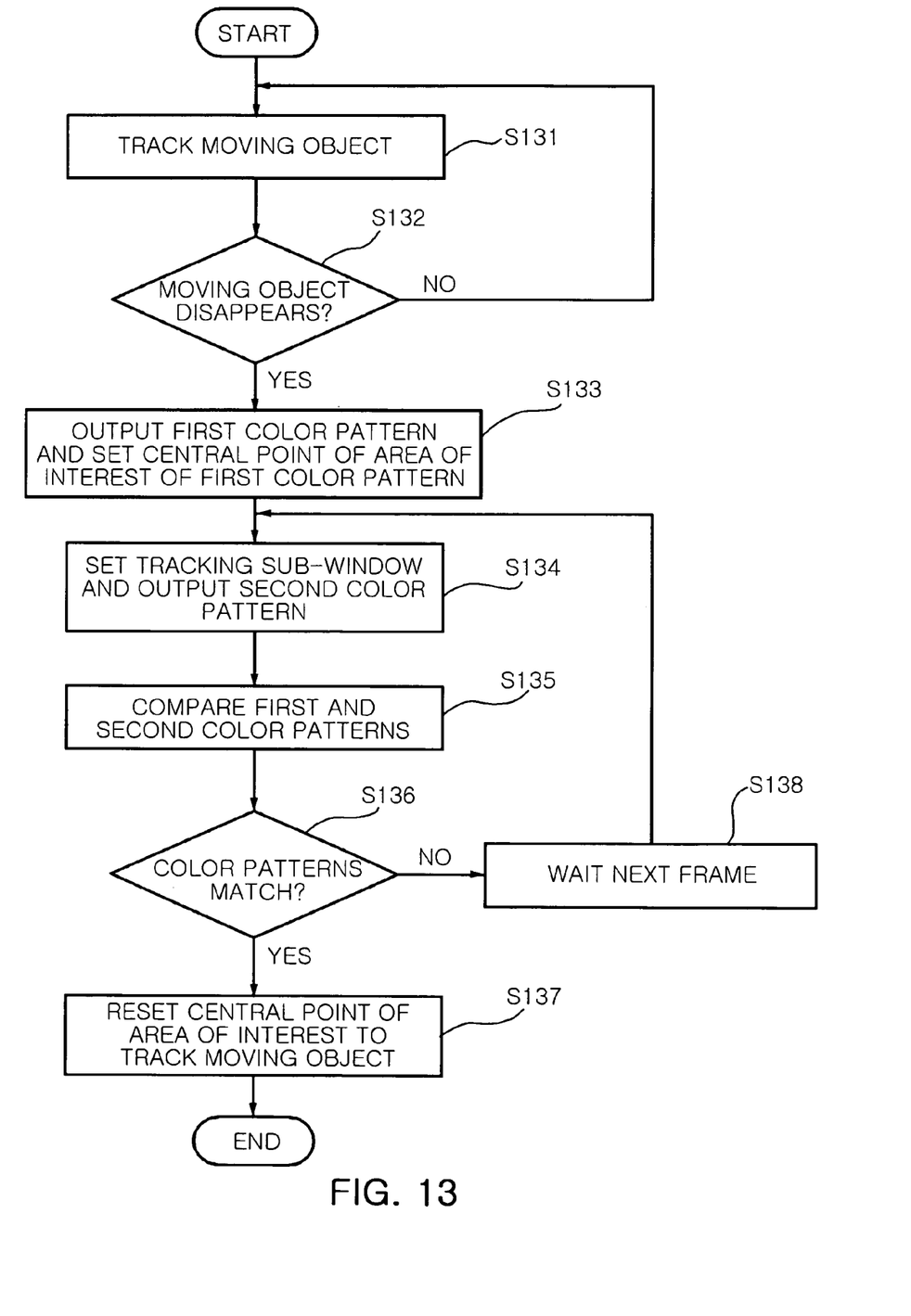
FIG. 13 is a flowchart illustrating a tracking process when a moving object disappears from an image according to an exemplary embodiment of the present invention.

FIG. 13 is a flowchart illustrating a tracking process when a moving object disappears from an image according to an exemplary embodiment of the invention.

First, as described above, a central point of area of interest is selected according to a user's input, an auto focusing area is set, and a tracking sub-window is set. The central point of area of interest selected according to the user's input, the auto focusing area and the tracking sub-window track the moving object in operation S131.

When the moving object disappears from the image in operation S132, a first color pattern corresponding to an average color value with respect to a predetermined area around the central point of area of interest selected by the user is output in a frame right before the moving object disappears, and a central point of area of interest on the basis of the first color pattern is set. The predetermined area around the central point of area of interest selected by the user may be the auto focus area centering on the central point of area of interest determined by the user.

The tracking sub-window 12, shown in FIG. 7, centering on the central point of area of interest based on the first color pattern is then set again. In a frame, following after the moving object has disappeared, second color patterns corresponding to average color values with respect to a plurality of areas 13, shown in FIG. 7, are output. Each of the second color patterns has a size corresponding to the predetermined area A1, shown in FIG. 7, encompassing the central point of area of interest in the reset tracking sub-window. As described above, the plurality of areas may have the same size as the initially determined auto focusing area.

Then, the first color pattern and each of the second color patterns are compared with each other in operation S135, if a comparison difference is smaller than a predetermined threshold value, that is, when the first color pattern and the second color pattern match in operation S136, it is determined that the moving object appears in the image. A central point of area of interest based on a color pattern of the area in which the corresponding second color pattern is output is set as a central point of area of interest for the tracking of the moving object having reappeared, and a moving object tracking algorithm is applied again to thereby track the moving object in operation S137.

When the first color pattern and the second color pattern do not match in operation S136, the input of a next frame is waited in operation S138, and the operations S134, S135 and S136 of outputting second color patterns with respect to the next frame and comparing the second color patterns with the first color pattern are repeated.

As set forth above, according to exemplary embodiments of the invention, even when a moving object moves within a predetermined image and becomes separated from the predetermined image, existing information about the moving object being tracked is not lost, so that the subject can be continuously and stably tracked.

According to exemplary embodiments of the invention, even when a moving object being tracked comes back into a predetermined image after the moving object moves outside the predetermined image or when a moving object is hidden by another object and disappears from the image, it is possible to keep tracking the subject.

Furthermore, robust tracking of a moving object is ensured despite various changes in photographing environment 15 or changes in the subject.

Furthermore, it is possible to make a quick response to a target shift from one moving object to another so as to be optimally applied to small devices such as mobile phones in terms of hardware.

While the present invention has been shown and described in connection with the exemplary embodiments, it will be apparent to those skilled in the art that modifications and variations can be made without departing from the spirit and scope of the invention as defined by the appended claims.

What is claimed is:

1. An auto-focusing method comprising:
   setting a central point of area of interest according to a user's input to select a moving object to perform auto tracking of the moving object within an image;
   setting an auto focusing area encompassing the central point of area of interest, the auto focusing area in which an operation is performed for auto focusing;
   setting a tracking sub-window encompassing the auto focusing area, the tracking sub-window in which an operation is performed for auto tracking; and
   tracking, by the central point of area of interest according to the user's input, the auto focusing area and the tracking sub-window, the moving object while changing a position of the auto focusing area and updating a position of the tracking sub-window according to a movement of the moving object,
   wherein an edge part of the tracking sub-window is maintained in alignment with an edge part of the image, and the auto focusing area alone inside the tracking sub-window moves toward the edge part of the image in order to track the moving object within the tacking sub-window when the moving object for auto tracking is being separated from the edge part of the image, and the auto focusing area and the tracking sub-window stay within the edge part of the image even when the moving object for auto tracking moves outside the edge part of the image and the auto focusing area alone moves within the tracking sub-window and reaches the edge part of the image.

2. The auto-focusing method of claim 1, wherein the tracking of the moving object comprises:

cutting the image inside the tracking sub-window to generate sub-images;

smoothing the sub-images in preceding and succeeding frames by convolving the sub-images according to a Gaussian function;

calculating gradients of the sub-images by convolving the sub-images with a derivative of the Gaussian function; and performing iteration to locate a new central point of area of interest.

3. The auto-focusing method of claim 2, wherein the calculation in conjunction with the tracking of the moving object is stopped when the central point of area of interest moves by one pixel, when the number of iteration exceeds a predetermined limit value or when the central point of area of interest is located outside boundaries.

4. The auto-focusing method of claim 1, wherein one central point of area of interest is input by the user by touchpad.

5. An auto-focusing method comprising:

setting a central point of area of interest according to a user's input to select a moving object to perform auto tracking of the moving object within an image;

setting an auto focusing area encompassing the central point of area of interest, the auto focusing area in which an operation is performed for auto focusing;

setting a tracking sub-window encompassing the auto focusing area, the tracking sub-window in which an operation is performed for auto tracking;

tracking, by the central point of area of interest according to the user's input, the auto focusing area and the tracking sub-window, the moving object while changing a position of the auto focusing area and updating a position of the tracking sub-window according to a movement of the moving object;

outputting a first color pattern corresponding to an average color value with respect to a predetermined area around the central point of area of interest set by the user in a frame right before the moving object disappears, and setting a central point of area of interest on the basis of the first color pattern when the moving object disappears from the image;

resetting a tracking sub-window centering on the central point of area of interest on the basis of the first color pattern, and outputting second color patterns corresponding to average color values with respect to a plurality of areas each having a size corresponding to a predetermined area around the central point of area of interest on the basis of the first color pattern in the reset tracking sub-window in a frame after the moving object disappears; and comparing the first color pattern with each of the second color patterns to determine that the moving object comes back into the image when a comparison difference is smaller than a predetermined threshold value, and setting a central point of area of interest based on a color pattern of an area where the corresponding second color pattern is output, as a central point of area of interest to track the moving object having reappeared.

6. The auto-focusing method of claim 5, wherein an edge part of the tracking sub-window is maintained in alignment with an edge part of the image, and the auto focusing area alone inside the tracking sub-window moves toward the edge part of the image in order to track the moving object within the tacking sub-window when the moving object for auto tracking is being separated from the edge part of the image, and the auto focusing area and the tracking sub-window stay within the edge part of the image even when the moving object for auto tracking moves outside the edge part of the image and the auto focusing area alone moves within the tracking sub-window and reaches the edge part of the image.

7. The auto-focusing method of claim 5, the predetermined area around the central point of area of interest set by the user is the auto focusing area centering on the central point of area of interest set by the user.

8. The auto-focusing method of claim 5, wherein the tracking of the moving object comprises:

cutting the image inside the tracking sub-window to generate sub-images;

smoothing sub-images in preceding and succeeding frames by convolving the sub-images according to a Gaussian function;

calculating gradients of the sub-images by convolving the sub-images with a derivative of the Gaussian function; and performing iteration to locate a new central point of area of interest.

9. The auto-focusing method of claim 8, wherein the calculation in conjunction with the tracking of the moving object is stopped when the central point of area of interest moves by one pixel, when the number of iteration exceeds a predetermined limit value or when the central point of area of interest is located outside boundaries.

10. The auto-focusing method of claim 5, wherein the one central point of area of interest is input by the user by touchpad.

* * * * *